(12) United States Patent
Jiang

(10) Patent No.: US 11,910,442 B2
(45) Date of Patent: Feb. 20, 2024

(54) RANDOM ACCESS CONTROL METHOD AND RANDOM ACCESS CONTROL DEVICE

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., ltd., Beijign (CN)

( * ) Notice: Subject to any disclaimer, the term of this patent is extended or adjusted under 35 U.S.C. 154(b) by 533 days.

(21) Appl. No.: 17/265,783

(22) PCT Filed: Aug. 3, 2018

(86) PCT No.: PCT/CN2018/098546
§ 371 (c)(1),
(2) Date: Feb. 3, 2021

(87) PCT Pub. No.: WO2020/024266
PCT Pub. Date: Feb. 6, 2020

(65) Prior Publication Data
US 2021/0168879 A1 Jun. 3, 2021

(51) Int. Cl.
*H04W 4/00* (2018.01)
*H04W 72/0453* (2023.01)

(52) U.S. Cl.
CPC ... *H04W 74/0833* (2013.01); *H04W 72/0453* (2013.01)

(58) Field of Classification Search
CPC . H04W 72/04; H04W 72/0453; H04W 74/08; H04W 74/0833
See application file for complete search history.

(56) References Cited

U.S. PATENT DOCUMENTS

2010/0034141 A1* 2/2010 Meylan ............ H04W 74/0833
370/328
2013/0034069 A1* 2/2013 Uemura ............ H04W 74/0833
370/328
(Continued)

FOREIGN PATENT DOCUMENTS

CN 101378589 A 3/2009
CN 102075428 A 5/2011
(Continued)

OTHER PUBLICATIONS

International Search Report of PCT Application No. PCT/CN2018/098546 dated Apr. 30, 2019 with English translation (4p).
(Continued)

*Primary Examiner* — Chi H Pham
*Assistant Examiner* — Elisabeth Benoit Magloire
(74) *Attorney, Agent, or Firm* — Arch & Lake LLP

(57) ABSTRACT

The present disclosure provides a random access control method, an electronic device, and a non-transitory computer readable storage medium. The method includes that a user equipment (UE) determines whether the random access process is successfully completed in response to receiving a bandwidth part switch command for a cell associated with a random access process during the random access process. Additionally, the UE stops the random access process in response to determining that the random access process is unsuccessfully completed. Furthermore, the UE switches a bandwidth part according to the bandwidth part switch command without continuing the random access process in the switched bandwidth part.

8 Claims, 9 Drawing Sheets

(56) References Cited

U.S. PATENT DOCUMENTS

2016/0373979 A1   12/2016   Dai et al.
2018/0139778 A1*   5/2018   Chou .................... H04W 74/04

FOREIGN PATENT DOCUMENTS

| | | |
|---|---|---|
| CN | 103648178 A | 3/2014 |
| CN | 104704898 A | 6/2015 |
| CN | 105577338 A | 5/2016 |
| CN | 107432005 A | 12/2017 |
| CN | 108322924 A | 7/2018 |
| CN | 108347789 A | 7/2018 |
| EP | 2680658 A2 | 1/2014 |
| WO | 2018127424 A1 | 7/2018 |
| WO | 2018128426 A1 | 7/2018 |

OTHER PUBLICATIONS

Institute for Information Industry (III), "RACH procedure with BWP", 3GPP TSG RAN WG1 Meeting AH 1801, Vancouver, Canada, R1-1800647, Jan. 22-26, 2018, (6p).

Nokia, Nokia Shanghai Bell, "Further details on BWP switch interaction with RA",3GPP TSG-RAN WG2 NR Ad hoc 1801, Vancouver, Canada, R2-1800961, Jan. 22-26, 2018, (5p).

MediaTek Inc., Qualcomm Incorporated, Panasonic, "On selecting UL BWP for CBRA",3GPP TSG-RAN WG2 Meeting #101Bis,Sanya, China, R2-1806165, Apr. 16-20, 2018, (6p).

Vivo, "Clarification on the RACH re-initiation after BWP switching", 3GPP TSG-RAN WG2 Meeting #101, R2-1801992, Athens, Greece, Feb. 26-Mar. 2, 2018, (4p).

Samsung, "Basic procedure for BWP switching", 3GPP TSG-RAN WG2 Meeting #101, R2-1802436, Athens, Greece, Feb. 26-Mar. 2, 2018, (4p).

InterDigital R2, "Corrections on BWP switching for RA-BFR", 3GPP TSG-RAN WG2 Meeting NR AH 1807, R2-1809722, Montreal, Canada, Jul. 2-6, 2018, (6p).

Zeng Lili, "Research of Random Access Technology Based on NB-IoT", Modern Information Technology, Jan. 25, 2018, (2p).

Qingwei Du, Mobile Computing in Wireless Communication, Chapter 21-Random Access Control, pp. 244-245, Jun. 30, 2016, (8p).

ISA State Intellectual Property Office of the People's Republic of China, Written Opinion of the International Searching Authority Issued in Application No. PCT/CN2018/098546, dated Apr. 30, 2019, WIPO, (8p).

* cited by examiner

RANDOM ACCESS CONTROL METHOD AND RANDOM ACCESS CONTROL DEVICE

CROSS REFERENCE TO RELATED APPLICATION

This application is the US national phase application of International Application No. PCT/CN2018/098546 filed on Aug. 3, 2018, the entire contents of which are incorporated herein by reference for all purposes.

TECHNICAL FIELD

The present disclosure relates to the field of communication, and in particular, to random access control methods, random access control apparatuses, electronic devices and computer readable storage media.

BACKGROUND

If a user equipment (UE) receives a bandwidth part (BWP) switch command when performing a random access process, the UE can stop the ongoing random access, switch the BWP according to the BWP switch command, and continue the stopped random access after the BWP switching is completed.

Based on the current method, the configured BWP of the UE is changed after the BWP switching, and the stopped random access is performed in the BWP switched from, which may cause some problems when the UE continues the stopped random access.

SUMMARY

The present disclosure provides a random access control method, a random access control apparatus, an electronic device and a computer readable medium.

According to a first aspect of the present disclosure, a random access control method is provided. The method includes that a UE determines whether the random access process is successfully completed in response to receiving a bandwidth part switch command for a cell associated with a random access process during the random access process. Additionally, the UE stops the random access process in response to determining that the random access process is unsuccessfully completed. Furthermore, the UE switches a bandwidth part according to the bandwidth part switch command without continuing the random access process in the switched bandwidth part.

According to a second aspect of the present disclosure, an electronic device is provided. The electronic device includes a processor; and a memory storing processor-executable instructions. The processor is configured to perform acts comprising: in response to receiving a bandwidth part switch command for a cell associated with a random access process during the random access process, determining whether the random access process is successfully completed; in response to determining that the random access process is unsuccessfully completed, stopping the random access process; and switching a bandwidth part according to the bandwidth part switch command without continuing the random access process in the switched bandwidth part.

According to a third aspect of the present disclosure, a non-transitory computer readable storage medium is provided. The non-transitory computer readable storage medium stores a plurality of programs for execution by an electronic device having one or more processors. The plurality of programs, when executed by the one or more processors, cause the electronic device to perform acts comprising: in response to receiving a bandwidth part switch command for a cell associated with a random access process during the random access process, determining whether the random access process is successfully completed; in response to determining that the random access process is unsuccessfully completed, stopping the random access process; switching a bandwidth part according to the bandwidth part switch command without continuing the random access process in the switched bandwidth part wherein the processor is configured to implement the steps in the methods of any of the above embodiments.

Accordingly, it avoids the situation in which, for continuing the stopped random access process, the switch operation which has been performed according to the bandwidth switch command does not work as if it was not executed so that the resources of the UE are wasted. That is, it ensures that the bandwidth switch command is actually executed and the UE can continue communication through the bandwidth part being switched to.

BRIEF DESCRIPTION OF THE DRAWINGS

The drawings related to the description of the examples will be briefly introduced to explain the technical solutions provided by the embodiments of this disclosure more clearly. It is obvious that, the drawings in the following description illustrate only some examples of the present disclosure, and based on these drawings, those of ordinary skill in the art may obtain other drawings without creative work.

DETAILED DESCRIPTION OF THE EMBODIMENTS

The following, in conjunction with the drawings of the present disclosure, will clearly and completely describe the technical solutions provided in the embodiments of the present disclosure. It is obvious that the described examples are partial examples, not all implementations of the present disclosure. Based on the examples provided in the present disclosure, all of other examples, which can be obtained by those of ordinary skill in the art without creative work, shall fall within the protection scope of this application.

Figure 1:
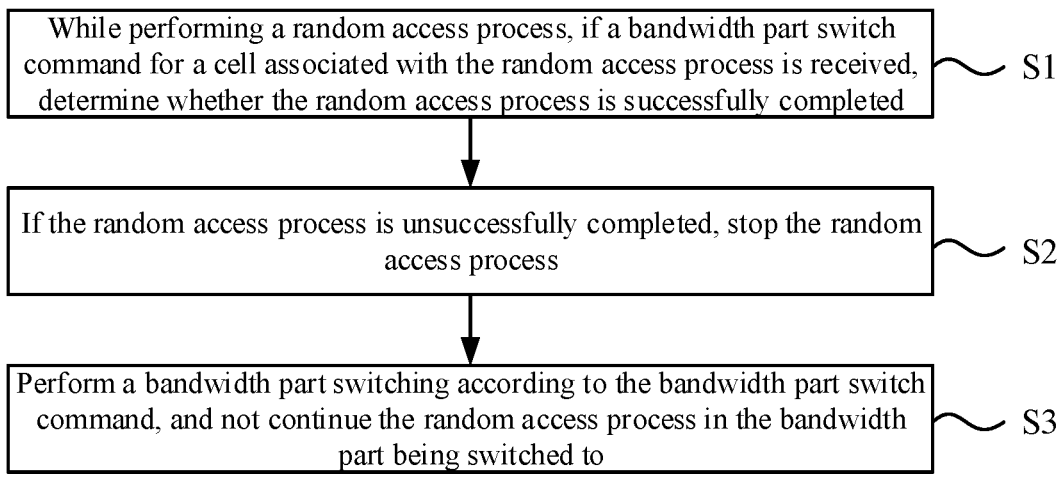
FIG. 1 is a schematic flowchart illustrating a random access control method according to an example of the present disclosure.

FIG. 1 is a schematic flowchart illustrating a random access control method according to an example of the present disclosure. The method shown in this embodiment can be applied to a user equipment (UE), such as a mobile phone, a tablet computer, a wearable device (bracelet, watch, helmet), etc. The UE can communicate with a base station, for example, it can communicate based on long term evolution (LTE), and based on new radio (NR).

In the related art, upon performing the random access process, when the UE receives a bandwidth part switch command for a cell associated with the random access process, the UE can choose to ignore the bandwidth part switch command, or can choose to stop the ongoing random access process, and then switch the bandwidth part according to the bandwidth part switching command, and continue the stopped random access process after switching the bandwidth part.

According to the current agreement, if the random access is initiated on SpCell (including primary cell PCell and primary secondary cell PScell), the downlink bandwidth part associated with the random access process and the uplink bandwidth part associated with the random access process are required to have a same ID.

However, when the UE chooses to stop the ongoing random access process, and switches the bandwidth part according to the bandwidth part switch command, if the bandwidth part switch command is for the cell associated with the random access process, it may result in that the bandwidth part being switched to is different from the bandwidth part used by the UE for performing the random access process before the switching. This may cause the ID of the bandwidth part being switched to has been changed relative to the bandwidth part being switched from.

If the UE continues the stopped random access process after switching the bandwidth part and the random access is initiated on the SpCell, since the ID of the bandwidth part being switched to has been changed relative to the bandwidth part being switched from, in order to continues the stopped random access process, the UE needs to find the bandwidth part of which the ID is the same as that of the bandwidth part associated with the previous random access process, and thus the bandwidth part being switched from is resumed to continue the random process, resulting in that the switch operation which has been performed according to the bandwidth switching command does not work as if it was not executed, which wastes the resources of the UE.

It should be noted that, an uplink bandwidth part associated with the random access process may refer to the uplink bandwidth part used by the UE for sending a random access message (such as MSG1), and a downlink bandwidth part associated with the random access process may refer to the downlink bandwidth part used by the UE for receiving a random access message (for example, MSG2).

Further, in some cases, for example, for unpaired spectrum, the uplink bandwidth part and the downlink bandwidth part on the carrier wave are the same. In this case, if the downlink bandwidth part of the carrier wave is associated with the random access process, the uplink bandwidth part of the carrier wave is also associated with the random access process.

As shown in FIG. 1, the random access control method includes the following steps.

At step S1, while performing a random access process, if a bandwidth part switch command for a cell associated with the random access process is received, it is determined whether the random access process is successfully completed.

In an embodiment, the cell associated with the random access process may include the cell where the UE sends a random access message (for example, MSG1, which contains the preamble for the random access) to a base station, or the cell where the UE receives the random access message (for example, MSG2, which contains the random access response, RAR) sent by the base station.

In an embodiment, the bandwidth part switch command may be sent by the base station through the physical downlink control channel (PDCCH). In this case, the bandwidth part switch command may be called PDCCH for BWP switching.

At step S2, if the random access process is unsuccessfully completed, the random access process is stopped;

At step S3, a bandwidth part switching is performed according to the bandwidth part switch command and the random access process is not continued in a bandwidth part being switched to.

According to the embodiments of the present disclosure, if the UE receives the bandwidth part switch command for the cell associated with the random access process which is being performed, when the random access process is unsuccessfully completed, that is, the random access process is still in the process, the random access process can be stopped, and then the bandwidth part switching is performed according to the bandwidth part switch command and the random access process is not continued in the bandwidth part being switched to.

Figure 2:
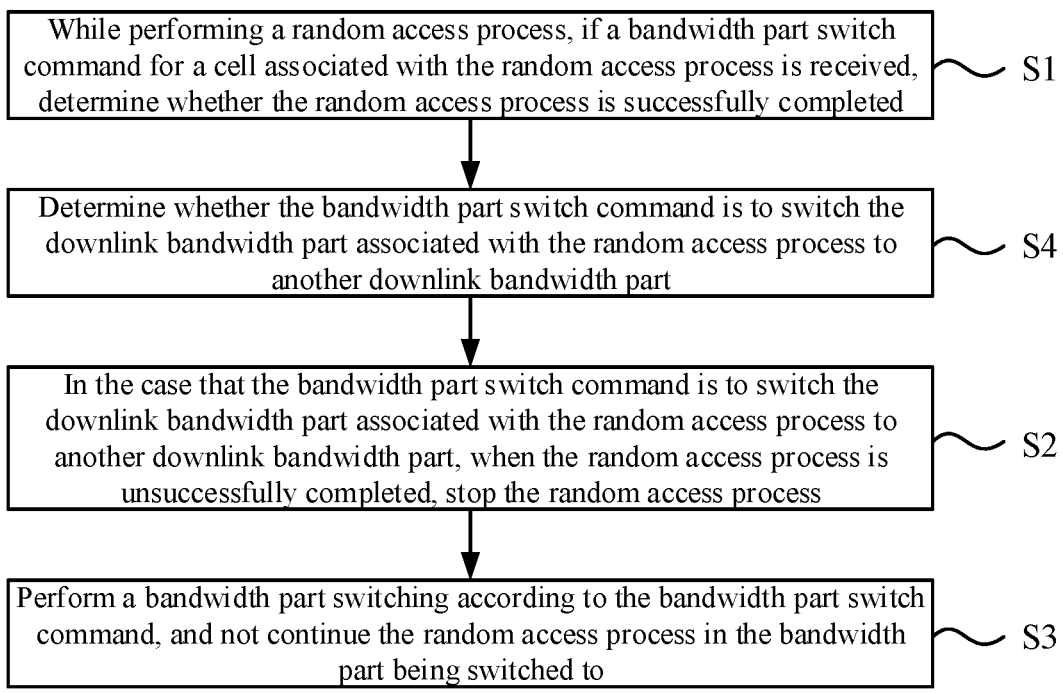
FIG. 2 is a schematic flowchart illustrating another random access control method according to an example of the present disclosure.

Accordingly, it avoids the situation in which, for continuing the stopped random access process, the switch operation which has been performed according to the bandwidth switch command does not work as if it was not executed so that the resources of the UE are wasted. That is, it ensures that the bandwidth switch command is actually executed and the UE can continue communication through the bandwidth part being switched to FIG. 2 is a schematic flowchart illustrating another random access control method according to an example of the present disclosure. As shown in FIG. 2, on the basis of the example shown in FIG. 1, the method further includes:

At step S4, before stopping the random access process, it is determined that whether the bandwidth part switch command is to switch the downlink bandwidth part associated with the random access process to another downlink bandwidth part;

In the case where the bandwidth part switch command is to switch the downlink bandwidth part associated with the random access process to another downlink bandwidth part, when the random access process is unsuccessfully completed, the random access process is stopped.

In an embodiment, the random access process is not over. Generally, it means that the user has not received at least a fourth random access message (MSG4), so when continuing the random access, the UE needs to use at least the downlink bandwidth part to receive the MSG4, and the uplink bandwidth part is not necessarily used for uplink transmission to the base station. Therefore, if the UE switches the downlink bandwidth part associated with the random access process according to the bandwidth part switch command, it is likely to cause the above problems, and if the bandwidth part that the UE switches according to the bandwidth part switch command is not the downlink bandwidth part associated with the random access process, the above problems may not occur.

Therefore, it can be determined whether the bandwidth part switch command is to switch the downlink bandwidth part associated with the random access process to another downlink bandwidth part, and in the case that the bandwidth part switch command is to switch the downlink bandwidth part associated with the random access process to another downlink bandwidth part, that is, when it is likely to cause the above problems, steps S2 and S3 are executed according to the embodiment of FIG. 1; and in other cases, the random access process can be continued after the switching the bandwidth part according to the methods in related arts. Accordingly, on the basis of ensuring that the bandwidth switch command is actually executed, the adjustment of the execution logic of the UE is reduced.

Figure 3:
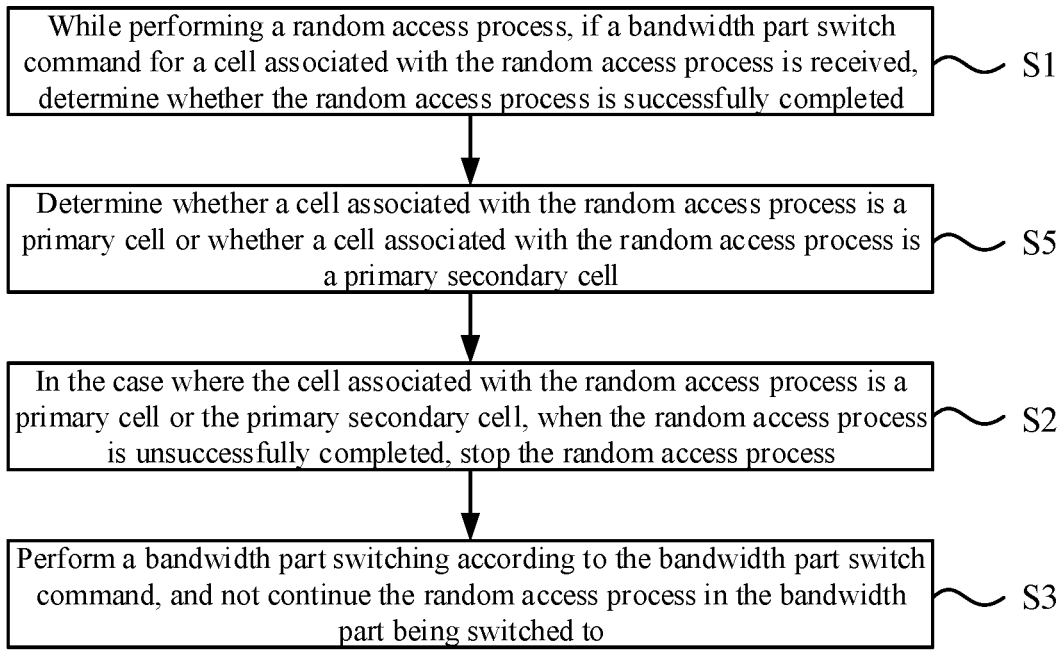
FIG. 3 is a schematic flowchart illustrating still another random access control method according to an example of the present disclosure.

FIG. 3 is a schematic flowchart illustrating still another random access control method according to an example of the present disclosure. As shown in FIG. 3, on the basis of the example shown in FIG. 1, the method further includes:

At step S5, before stopping the random access process, it is determined that whether a cell associated with the random access process is a primary cell or a primary secondary cell.

In the case where the cell associated with the random access process is a primary cell or the primary secondary cell, when the random access process is unsuccessfully completed, the random access process is stopped.

In an embodiment, as described in the related art, only when the random access is initiated on the primary cell or the primary secondary cell (that is, SpCell), it may cause the problem of that the switching operation has been performed according to the bandwidth switch command does not work as if it was not executed so that the resources of the UE are wasted.

Therefore, whether a cell associated with the random access process is a primary cell or a primary secondary cell can be determined, and in the case that the cell associated with the random access process is the primary cell or the primary secondary cell, that is, when it is likely to cause the above problems, steps S2 and S3 are executed according to the embodiment of FIG. 1; and in other cases, the random access process can be continued after the switching the bandwidth part according to the methods in related arts. Accordingly, on the basis of ensuring that the bandwidth switch command is actually executed, the adjustment of the execution logic of the UE is reduced.

Figure 4:
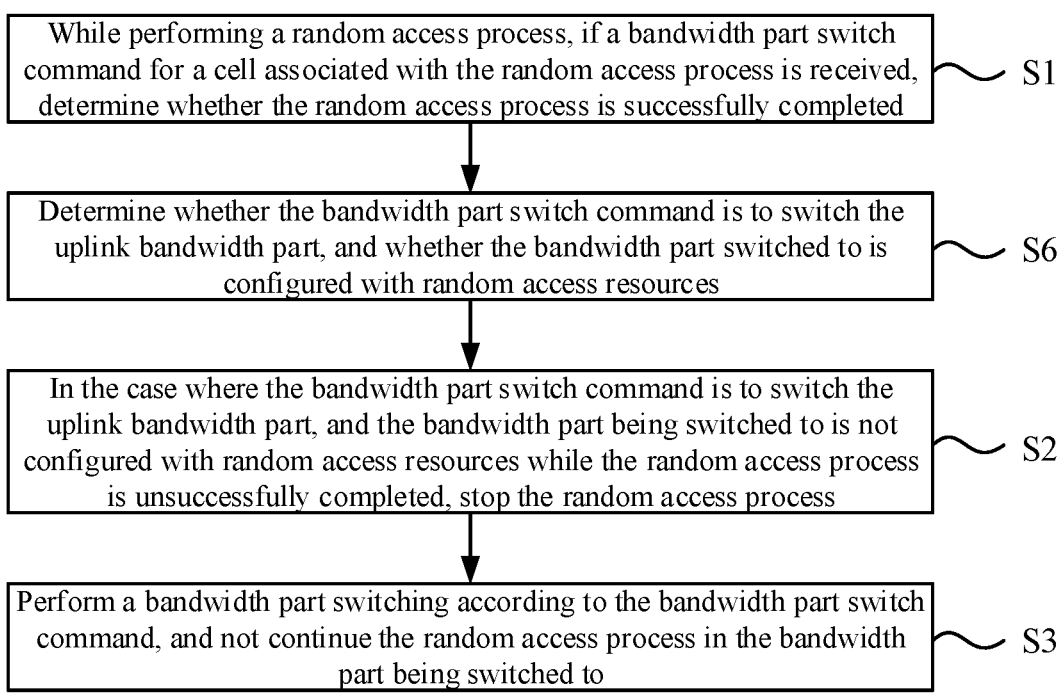
FIG. 4 is a schematic flowchart illustrating still another random access control method according to an example of the present disclosure.

FIG. 4 is a schematic flowchart illustrating still another random access control method according to an example of the present disclosure. As shown in FIG. 4, on the basis of the example shown in FIG. 1, the method further includes:

At step S6, before stopping the random access process, it is determined that whether the bandwidth part switch command is to switch the uplink bandwidth part, and whether the bandwidth part being switched to is configured with random access resources.

In the case where the bandwidth part switch command is to switch the uplink bandwidth part, and the bandwidth part being switched to is not configured with random access resources, when the random access process is unsuccessfully completed, the random access process is stopped.

When the bandwidth part switch command is to switch the uplink bandwidth part, but the bandwidth part being switched to is not configured with random access resources (PRACH resources), in this case, if the UE continues the stopped random access process, the random access cannot be performed when the uplink bandwidth part being switched to is used. In order to continue the random access, it has to be switched to the uplink bandwidth part being switched from, which may also cause the problem of that the switching operation has been performed according to the bandwidth switch command does not work as if it was not executed so that the resources of the UE are wasted.

As mentioned above, only when the bandwidth switch command is to switch the uplink bandwidth part, and the bandwidth part being switched to is not configured with random access resources, it may cause the problem of that the switching operation has been performed according to the bandwidth switch command does not work as if it was not executed so that the resources of the UE are wasted.

Therefore, according to this embodiment, it can be determined whether the bandwidth part switch command is to switch the uplink bandwidth part, and whether the bandwidth part being switched to is configured with random access resources; in the case that the bandwidth part switch command is to switch the uplink bandwidth part, and the bandwidth part being switched to is not configured with random access resources, that is, when it is likely to cause the above problems, steps S2 and S3 are executed according to the embodiment of FIG. 1; and in other cases, the random access process can be continued after the switching the bandwidth part according to the methods in related arts. Accordingly, on the basis of ensuring that the bandwidth switch command is actually executed, the adjustment of the execution logic of the UE is reduced.

Figure 5:
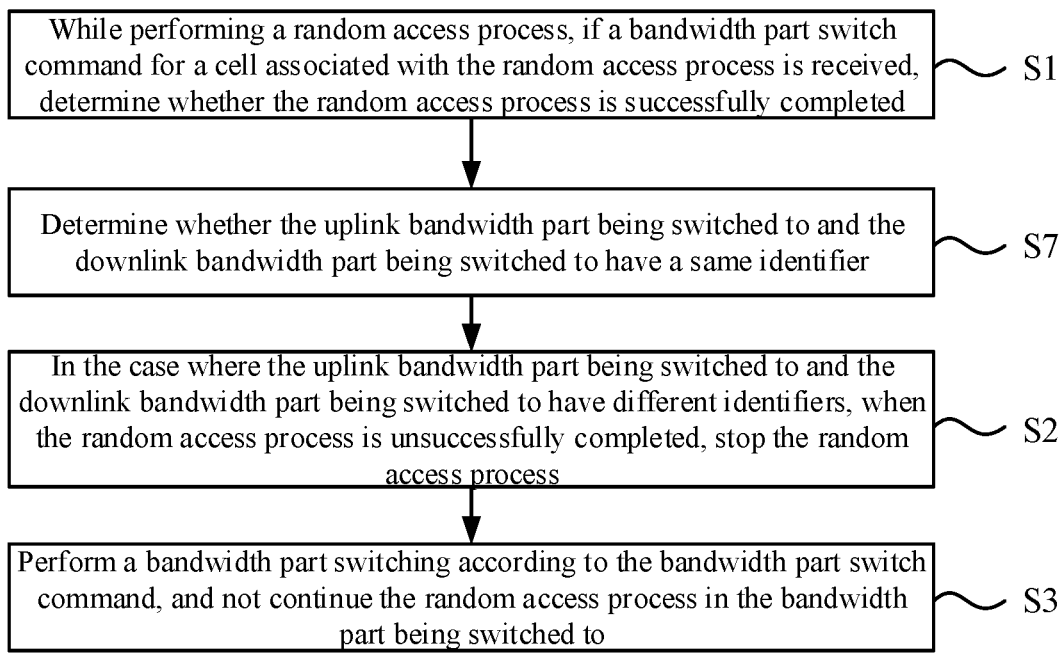
FIG. 5 is a schematic flowchart illustrating still another random access control method according to an example of the present disclosure.

FIG. 5 is a schematic flowchart illustrating still another random access control method according to an example of the present disclosure. As shown in FIG. 5, on the basis of the example shown in FIG. 1, the method further includes:

At step S7, before stopping the random access process, it is determined whether the uplink bandwidth part being switched to and the downlink bandwidth part being switched to have a same identifier.

In the case where the uplink bandwidth part being switched to and the downlink bandwidth part being switched to have different identifiers, when the random access process is unsuccessfully completed, the random access process is stopped.

As mentioned above, only when the downlink bandwidth part associated with the random access process and the uplink bandwidth part associated with the random access process have different identifiers, it may cause the problem of that the switching operation has been performed according to the bandwidth switch command does not work as if it was not executed so that the resources of the UE are wasted.

Therefore, according to this embodiment, in the case where the bandwidth part switch command is to switch the uplink bandwidth part and the downlink bandwidth part, it can be determined that whether the uplink bandwidth part being switched to and the downstream bandwidth part being switched to have a same identifier. When the uplink bandwidth part and the downlink bandwidth part have the same identifier, that is, when it is likely to cause the above problems, steps S2 and S3 are executed according to the embodiment of FIG. 1; and in other cases, the random access process can be continued after switching the bandwidth part according to the methods in related arts. Accordingly, on the basis of ensuring that the bandwidth switch command is actually executed, the adjustment of the execution logic of the UE is reduced.

Figure 6:
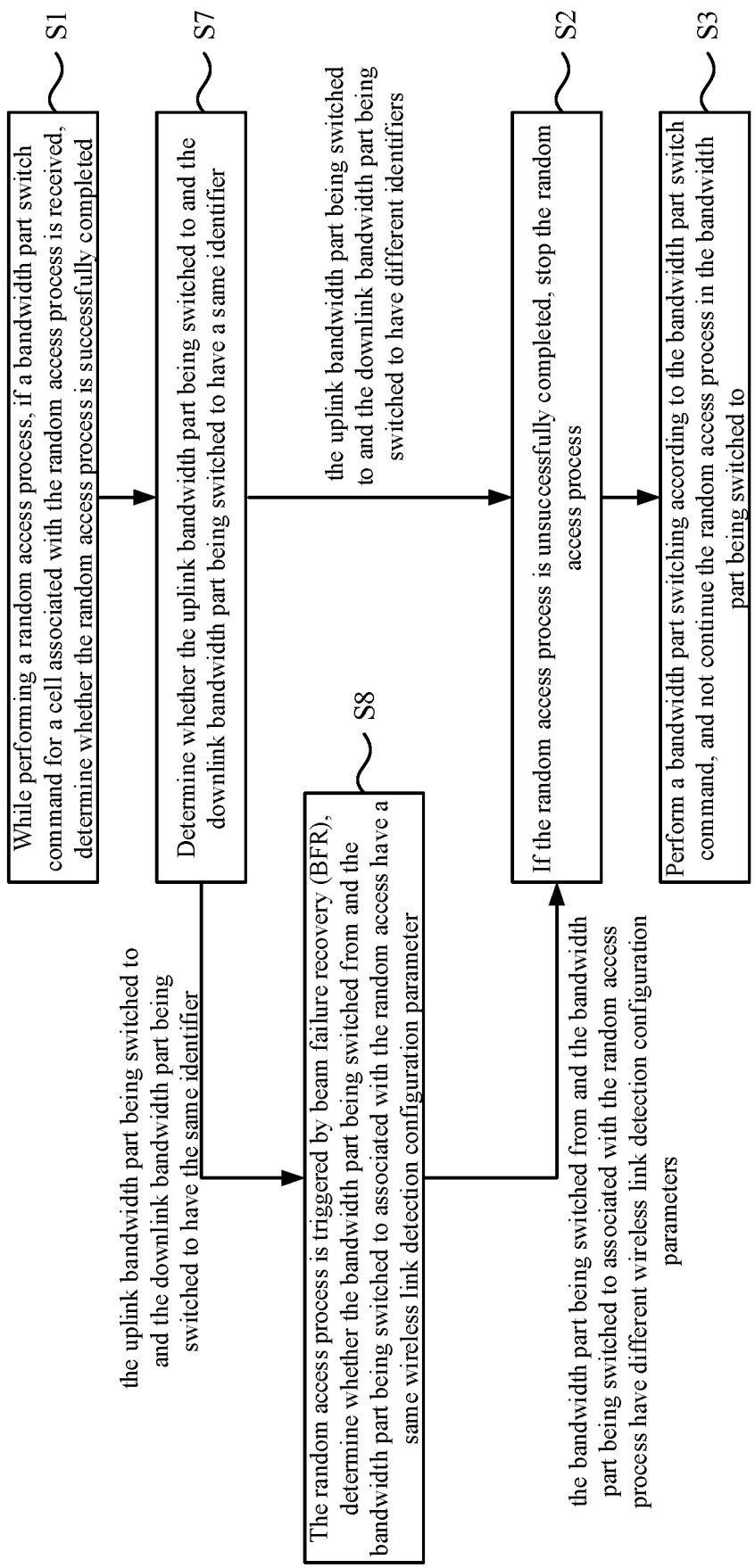
FIG. 6 is a schematic flowchart illustrating still another random access control method according to an example of the present disclosure.

FIG. 6 is a schematic flowchart illustrating still another random access control method according to an example of the present disclosure. As shown in FIG. 6, on the basis of the example shown in FIG. 5, the method further includes:

At step S8, if the uplink bandwidth part being switched to and the downlink bandwidth part being switched to have the same identifier, and the random access process is triggered by a beam failure recovery (BFR), it is determined that whether the bandwidth part being switched from and the bandwidth part being switched to associated with the random access have a same wireless link detection configuration parameter.

In the case where the bandwidth part being switched from and the bandwidth part being switched to associated with the random access process have different wireless link detection configuration parameters, when the random access process is unsuccessfully completed, the random access process is stopped.

In an embodiment, in some cases, even if the uplink bandwidth part being switched to and the downlink bandwidth part being switched to have the same identifier, there may still be a problem. For example, the random access process is triggered by a beam failure recovery. In this case, the UE needs to measure the beam according to the configuration parameters of radio link monitoring (RLM) so as to determine the beam quality, and further determine which beam to select for the beam failure recovery according to the determined beam quality.

When the bandwidth part being switched from and the bandwidth part being switched to associated with the random access have different wireless link detection configuration parameters, the selectable beam determined by the UE based on the wireless link detection configuration parameters of the bandwidth part being switched from is different from the selectable beam determined by the UE based on the wireless link detection configuration parameters of the bandwidth part being switched to, which may cause the UE to perform beam failure recovery without knowing which beam to select, and in this case, if continues the stopped random access process, the beam failure recovery cannot be completed due to that which beam to select is unknown, thus the stopped random access process cannot be continued.

Therefore, according to this embodiment, in the case that the random access process is triggered by a beam failure recovery, it can be determined that whether the bandwidth part being switched from and the bandwidth part being switched to associated with the random access process have a same wireless link detection configuration parameter, in the case that the bandwidth part being switched from and the bandwidth part being switched to associated with the random access process have different wireless link detection configuration parameters, that is, when it is likely to cause the stopped random access process cannot be continued, steps S2 and S3 are executed according to the embodiment of FIG. 1 to avoid the problem of the UE being unable to continue the stopped random access; and in other cases, the random access process can be continued after switching the bandwidth part according to the methods in related arts. Accordingly, on the basis of avoiding the problem of the UE being unable to continue the stopped random access process, the adjustment of the execution logic of the UE is reduced.

It should be noted that the wireless link detection configuration parameters may include at least one of the following:

radio link detection reference symbol (RLM RS) configuration, different beam failure detection timers, different beam failure instance max count.

Figure 7:
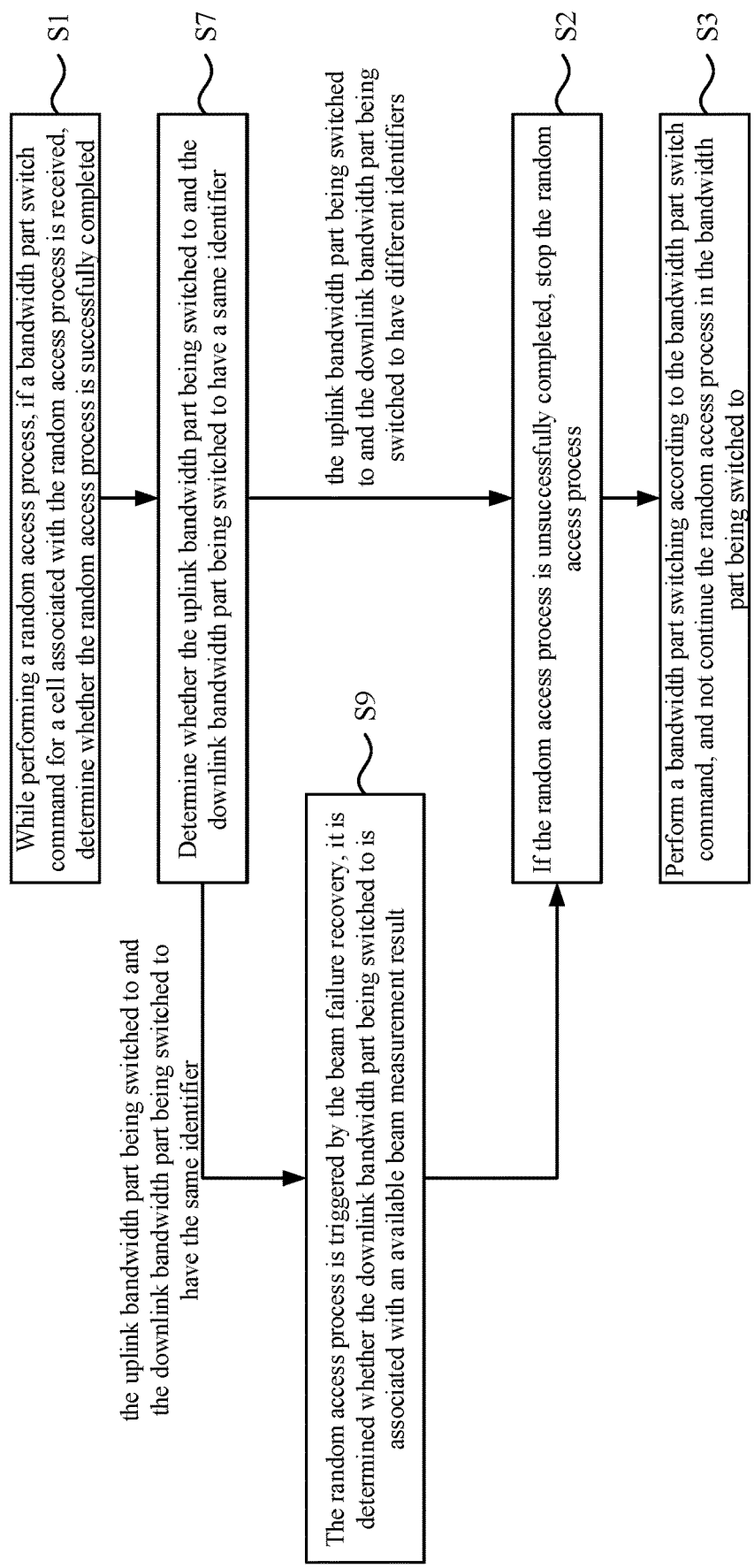
FIG. 7 is a schematic flowchart illustrating still another random access control method according to an example of the present disclosure.

FIG. 7 is a schematic flowchart illustrating still another random access control method according to an example of the present disclosure. As shown in FIG. 7, on the basis of the example shown in FIG. 5, the method further includes:

At step S9, if the uplink bandwidth part being switched to and the downlink bandwidth part being switched to have the same identifier, and the random access process is triggered by the beam failure recovery, it is determined whether the downlink bandwidth part being switched to is associated with an available beam measurement result.

In the case where the downlink bandwidth part being switched to is not associated with an available beam measurement result, when the random access procedure is unsuccessfully completed, the random access process is stopped.

In an embodiment, in some cases, even if the uplink bandwidth part being switched to and the downlink bandwidth part being switched to have the same identifier, there may still be a problem. For example, the random access process is triggered by a beam failure recovery, in this case, the UE needs to determine the beam quality according to an available beam measurement result, and then further determine which beam to select for the beam failure recovery according to the determined beam quality.

When the downlink bandwidth part being switched to is not associated with an available beam measurement, the UE cannot find the available beam measurement result based on the downlink bandwidth part being switched to, which may cause the UE to perform beam failure recovery without knowing which beam to select, and in this case, if continues the stopped random access process, the beam failure recovery cannot be completed due to that which beam to select is unknown, thus the stopped random access process cannot be continued.

Therefore, according to this embodiment, for the case that the random access process is triggered by a beam failure recovery, it can be determined whether the downlink bandwidth part being switched to is associated with an available beam measurement result, and in the case where the downlink bandwidth part being switched to is not associated with an available beam measurement result, that is, when it is likely to cause the stopped random access process cannot be continued, steps S2 and S3 are executed according to the embodiment of FIG. 1 to avoid the problem of the UE being unable to continue the stopped random access; and in other cases, the random access process can be continued after switching the bandwidth part according to the methods in related arts. Accordingly, on the basis of avoiding the problem of the UE being unable to continue the stopped random access process, the adjustment of the execution logic of the UE is reduced.

It should be noted that for determining whether the downlink bandwidth switched to is associated with an available beam measurement result, the determined beam measurement result can refer to different measurement results. For example, when random access is a contention based random access (CBRA), the beam measurement result can refer to a reference signal receiving power (SSB-RSRP) measurement result. When the random access is contention free random access (CFRA), the measurement result can be a SSB-RSRP measurement result and/or a channel state information (CSI)-RSRP measurement result.

It should be noted that SSB is short for synchronization signal block, which specifically means synchronization/physical broadcast channel (PBCH) block. Because a synchronization signal and a PBCH can be packaged and processed together at the physical layer, they are collectively called SSB.

The synchronization signal can include a primary synchronization signal (PSS) and a secondary synchronization signal (SSS), and the PBCH can include demodulation reference signal (PBCH DMRS) and PBCH data.

Corresponding to the foregoing embodiment of the random access control method, the present disclosure also provides an embodiment of a random access control apparatus.

Figure 8:
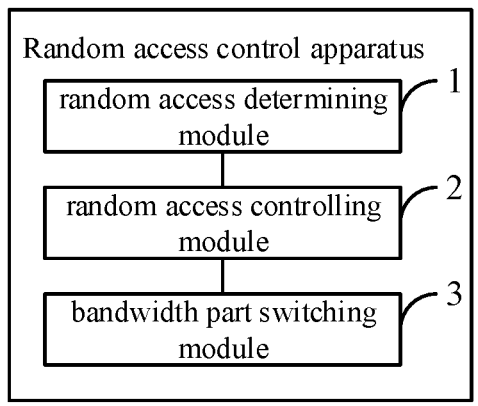
FIG. 8 is a schematic block diagram illustrating a random access control apparatus according to an example of the present disclosure.

FIG. 8 is a schematic block diagram illustrating a random access control apparatus according to an example of the present disclosure. The apparatus shown in this embodiment can be applied to a UE, such as a mobile phone, a tablet computer, a wearable device (bracelet, watch, helmet), etc. The UE can communicate with a base station, for example, communicating based on long term evolution (LTE), or based on new radio (NR).

As shown in FIG. 8, the random access control apparatus may include:

a random access determining module 1, configured to, while performing a random access process, if a bandwidth part switch command for a cell associated with the random access process is received, determine whether the random access process is successfully completed.

a random access controlling module 2, configured to, if the random access process is unsuccessfully completed, the random access process is stopped;

a bandwidth part switching module 3, configured to perform a bandwidth part switching according to the bandwidth part switch command and not continue the random access process in the bandwidth part being switched to.

Figure 9:
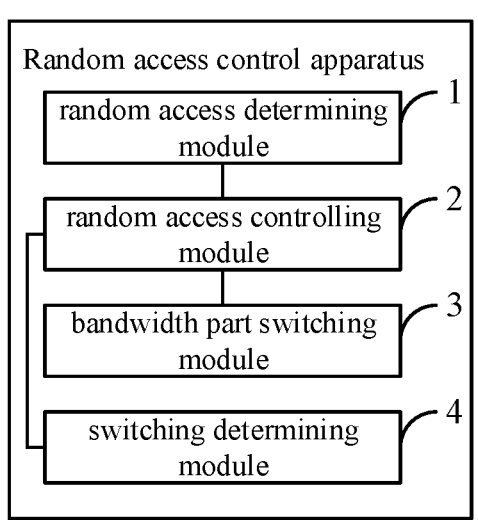
FIG. 9 is a schematic block diagram illustrating another random access control apparatus according to an example of the present disclosure.

FIG. 9 is a schematic block diagram illustrating another random access control apparatus according to an example of the present disclosure. As shown in FIG. 9, on the basis of the example shown in FIG. 8, the apparatus further includes:

a switching determining module 4, configured to before stopping the random access process, determine whether the bandwidth part switch command is to switch the downlink bandwidth part associated with the random access process to another downlink bandwidth part;

the random access controlling module 2 is configured to, in the case where the bandwidth part switch command is to switch the downlink bandwidth part associated with the random access process to another downlink bandwidth part, when the random access process is unsuccessfully completed, the random access process is stopped.

Figure 10:
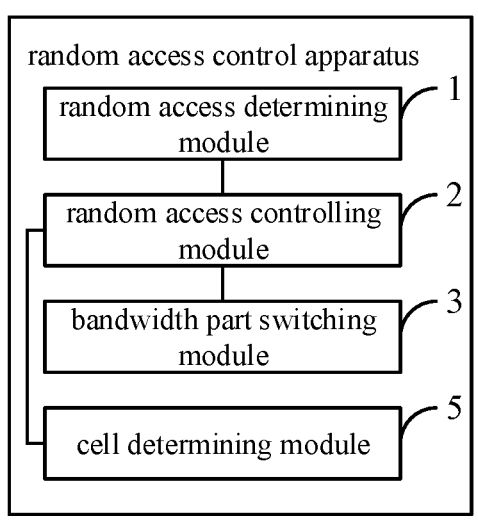
FIG. 10 is a schematic block diagram illustrating still another random access control apparatus according to an example of the present disclosure.

FIG. 10 is a schematic block diagram illustrating still another random access control apparatus according to an example of the present disclosure. As shown in FIG. 10, on the basis of the example shown in FIG. 8, the apparatus further includes:

a cell determining module 5, configured to before stopping the random access process, determine whether a cell associated with the random access process is a primary cell or a primary secondary cell;

the random access controlling module 2 is configured to, in the case where the cell associated with the random access process is a primary cell or the primary secondary cell, when the random access process is unsuccessfully completed, stop the random access process.

Figure 11:
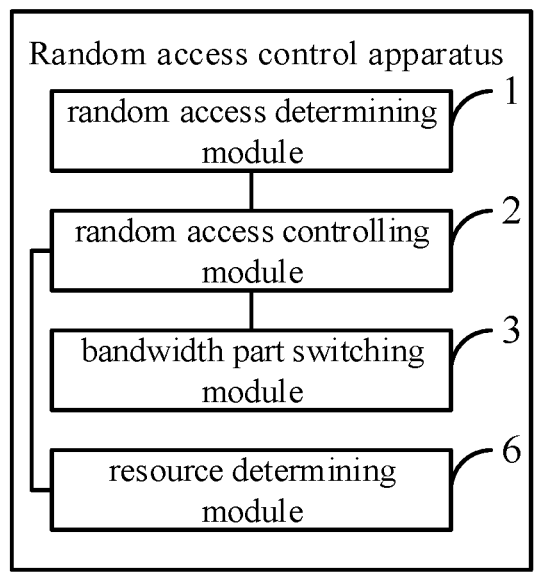
FIG. 11 is a schematic block diagram illustrating still another random access control apparatus according to an example of the present disclosure.

FIG. 11 is a schematic block diagram illustrating still another random access control apparatus according to an example of the present disclosure. As shown in FIG. 11, on the basis of the example shown in FIG. 8, the apparatus further includes:

a resource determining module 6, configured to before stopping the random access process, determine whether the bandwidth part switch command is to switch the uplink bandwidth part, and whether the bandwidth part being switched to is configured with random access resources;

the random access controlling module 2 is configured to, in the case where the bandwidth part switch command is to switch the uplink bandwidth part, and the bandwidth part being switched to is not configured with random access resources, when the random access process is unsuccessfully completed, stop the random access process.

Figure 12:
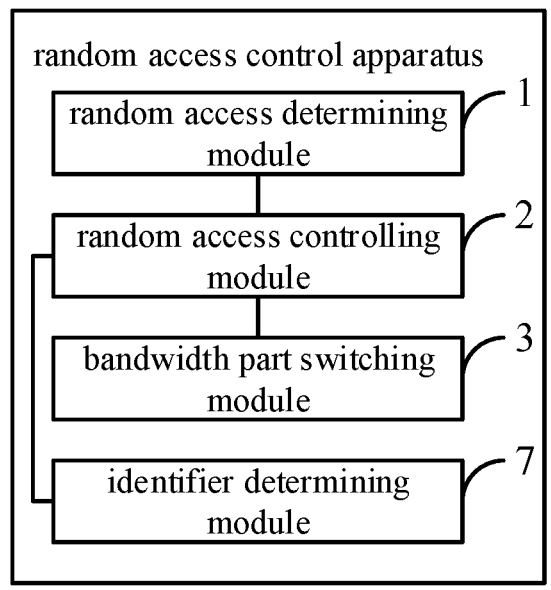
FIG. 12 is a schematic block diagram illustrating still another random access control apparatus according to an example of the present disclosure.

FIG. 12 is a schematic block diagram illustrating still another random access control apparatus according to an example of the present disclosure. As shown in FIG. 12, on the basis of the example shown in FIG. 8, the apparatus further includes:

an identifier determining module 7, configured to before stopping the random access process, determine whether the uplink bandwidth part being switched to and the downlink bandwidth part being switched to have a same identifier;

the random access controlling module 2 is configured to, in the case where the uplink bandwidth part being switched to and the downlink bandwidth part being switched to have different identifiers, when the random access process is unsuccessfully completed, stop the random access process.

Figure 13:
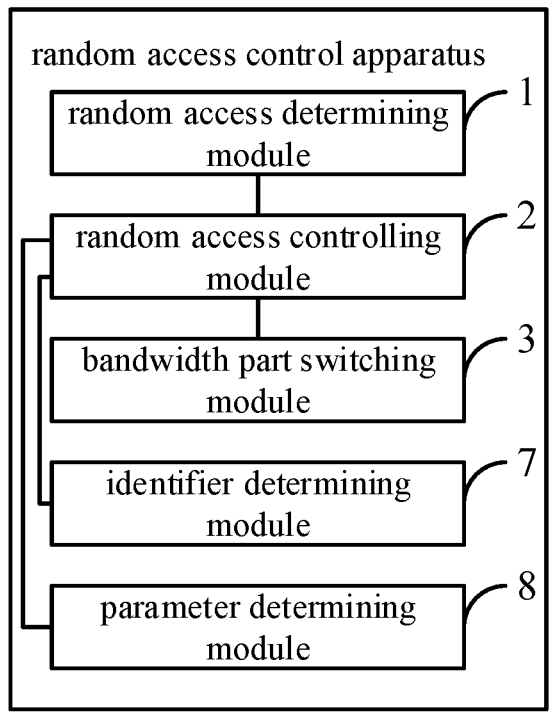
FIG. 13 is a schematic block diagram illustrating still another random access control apparatus according to an example of the present disclosure.

FIG. 13 is a schematic block diagram illustrating still another random access control apparatus according to an example of the present disclosure. As shown in FIG. 13, on the basis of the example shown in FIG. 12, the apparatus further includes:

a parameter determining module 8, configured to if the uplink bandwidth part being switched to and the downlink bandwidth part being switched to have the same identifier, and the random access process is triggered by a beam failure recovery, determine whether the bandwidth part being switched from and the bandwidth part being switched to associated with the random access have a same wireless link detection configuration parameter;

the random access controlling module 2 is configured to, in the case where the bandwidth part being switched from and the bandwidth part being switched to associated with the random access process have different wireless link detection configuration parameters, when the random access process is unsuccessfully completed, stop the random access process.

Figure 14:
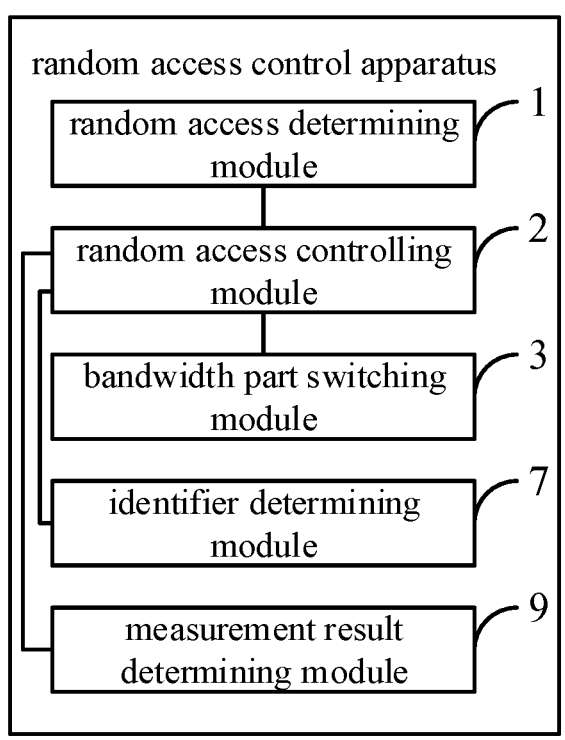
FIG. 14 is a schematic block diagram illustrating still another random access control apparatus according to an example of the present disclosure.

FIG. 14 is a schematic block diagram illustrating still another random access control apparatus according to an example of the present disclosure. As shown in FIG. 14, on the basis of the example shown in FIG. 12, the apparatus further includes:

a measurement result determining module 9, configured to, if the uplink bandwidth part being switched to and the downlink bandwidth part being switched to have the same identifier, and the random access process is triggered by the beam failure recovery, determine whether the downlink bandwidth part being switched to is associated with an available beam measurement result;

the random access controlling module 2 is configured to, in the case where the downlink bandwidth part being switched to is not associated with an available beam measurement result, when the random access procedure is unsuccessfully completed, stop the random access process.

Regarding the apparatus in the foregoing examples, the specific manner in which each module performs its operations has been described in detail in the examples of the related method, and will not be repeated here.

For the device examples, since they basically correspond to the method examples, reference may be made to the partial description of the method examples. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. One of ordinary skill in the art can understand and implement the present disclosure without creative work.

An example of the present disclosure further provides an electronic device, including:

a processor; and a memory storing processor-executable instructions;

wherein, the processor is configured to execute the steps in the method described in any of the foregoing embodiments.

The embodiment of the present disclosure also provides a computer-readable storage medium storing a computer program thereon, when the program is executed by the processor, the steps in the method described in any of the foregoing embodiments are implemented.

Figure 15:
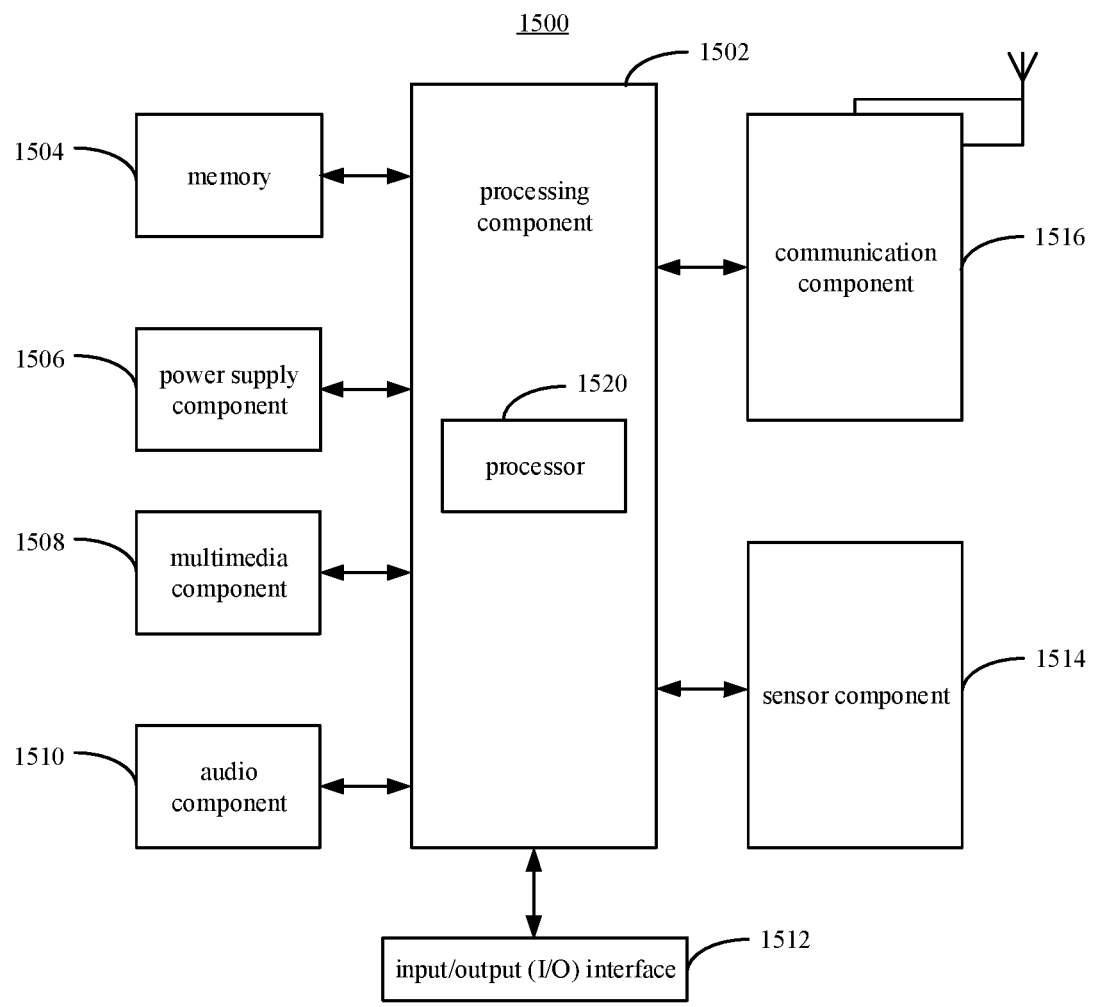
FIG. 15 is a schematic block diagram illustrating a random access control apparatus according to an example of the present disclosure.

FIG. 15 is a schematic block diagram illustrating a random access control apparatus 1500 according to an example of the present disclosure. For example, the device 1500 may be a mobile phone, a computer, a digital broadcasting terminal, a messaging device, a game console, a tablet device, a medical device, a fitness device, a personal digital assistant, and the like.

Referring FIG. 15, the apparatus 1500 may include one or more of the following components: a processing component 1502, a memory 1504, a power supply component 1506, a multimedia component 1508, an audio component 1510, an input/output (I/O) interface 1512, a sensor component 1514, and a communication component 1516.

The processing component 1502 generally controls the overall operations of the apparatus 1500, such as operations associated with display, telephone call, data communication, camera operation, and recording operation. The processing component 1502 can include one or more processors 1520 to execute instructions to complete all or part of the steps of the above methods. In addition, the processing component 1502 can include one or more modules which facilitate the interaction between the processing component 1502 and other components. For example, the processing component 1502 can include a multimedia module to facilitate the interaction between the multimedia component 1508 and the processing component 1502.

The memory 1504 is configured to store various types of data to support the operation of the device 1500. Examples of the data include instructions for any application or method operated on the apparatus 1500, contact data, phone book data, messages, pictures, videos, and etc. The memory 1504 can be implemented by any type of volatile or non-volatile storage devices or their combination, such as a static random access memory (SRAM), an electrically erasable programmable read-only memory (EEPROM), erasable Programmable read only memory (EPROM), a programmable read only memory (PROM), a read only memory (ROM), a magnetic memory, a flash memory, a magnetic or optical disk.

The power supply component 1506 supplies power for different components of the apparatus 1500. The power supply component 1506 may include a power management system, one or more power supplies, and other components associated with generation, management, and distribution of power for the apparatus 1500.

The multimedia component 1508 includes a screen providing an output interface between the device 1500 and a user. In some embodiments, the screen may include a liquid crystal display (LCD) and a touch panel (TP). When the screen includes a touch panel, the screen may be implemented as a touch screen to receive input signals from the user. The TP can include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 1508 includes a front camera and/or a rear camera. The front camera and/or rear camera may receive external multimedia data when the device 1500 is in an operating mode, such as a photographing mode or a video mode. Each of the front camera and the rear camera can be a fixed optical lens system or have focal length and optical zooming capability.

The audio component 1616 is configured to output and/or input an audio signal. For example, the audio component 1616 includes a microphone (MIC). When the device 1500 is in an operating mode, such as a call mode, a record mode and a voice recognition mode, the microphone is configured to receive an external audio signal. The received audio signal may be further stored in the memory 1504 or transmitted via the communication component 2608. In some examples, the audio component 1616 further includes a speaker for outputting an audio signal.

The I/O interface 1512 provides an interface between the processing component 1502 and a peripheral interface module which may be a keyboard, a click wheel, a button, or the like. These buttons may include but are not limited to: home button, volume button, start button, and lock button.

The sensor component 1514 includes one or more sensors for providing the apparatus 1500 with status assessment in various aspects. For example, the sensor component 1514 may detect an open/closed state of the device 1500 and a relative positioning of components such as the display and keypad of the device 1500, and the sensor component 1514 can also detect a change in position of the device 1500 or a component of the device 1500, the presence or absence of user contact with the device 1500, orientation or acceleration/deceleration of the device 1500, and temperature change of the device 1500. The sensor assembly 1514 may include a proximity sensor configured to detect presence of nearby objects without physical contact. The sensor component 1514 may further include an optical sensor, such as a CMOS or CCD image sensor, for imaging applications. In some examples, the sensor component 1514 can further include an acceleration sensor, a gyroscope sensor, a magnetic sensor, a pressure sensor, or a temperature sensor.

The communication component 1516 is configured to facilitate wired or wireless communication between the device 1500 and other devices. The apparatus 1500 can access a wireless network based on a communication standard, such as WiFi, 2G or 3G, or a combination thereof. In an example, the communication component 1516 receives a broadcast signal or broadcast related information from an external broadcast management system via a broadcast channel. In one or more embodiments, the communication component 1516 also includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the apparatus 1500 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing a message sending method according to any of the examples as described above.

In an exemplary embodiment of the present disclosure, there is further provided a non-transitory computer-readable storage medium having instructions, such as the memory 1504 having instructions, which can be executed by the processor 1520 of the device 1500 to complete the foregoing methods. For example, the non-transitory computer-readable storage medium can be a ROM, a random access memory (RAM), a CD-ROM, a magnetic tape, a floppy disk, an optical data storage device, or the like.

After considering the specification and practicing the disclosure disclosed herein, one of ordinary skill in the art will easily conceive of other embodiments of the present disclosure. This disclosure is intended to cover any variations, applications, or adaptive changes of the present disclosure. These variations, applications, or adaptive changes follow the general principles of the present disclosure and include common knowledge or conventional technical means in the art not recorded in the present disclosure. The description and the embodiments are only illustrative, and the true scope and spirit of the present disclosure are set forth in the appended claims.

It should be understood that the present disclosure is not limited to the exact structure that has been described above and illustrated in the drawings, and various modifications and changes can be made without departing from the scope of the present disclosure. The scope of the present disclosure is only limited by the appended claims.

It should be noted that in the present disclosure, relational terms such as first and second are only used to distinguish one entity or operation from another entity or operation, and do not necessarily suggest or imply any actual relationship or sequence between these entities or operations. The terms "include", "comprise" or any other variants thereof are intended to cover non-exclusive inclusion, so that a process, method, article or device including a series of elements not only includes those elements, but also includes other elements not explicitly listed, or further include elements inherent to such processes, methods, articles, or devices. If there are no additional restrictions, the element defined by the sentence "including a . . . " does not exclude the existence of other identical elements in the process, method, article, or equipment that includes the element.

The method and device provided by the examples of the present disclosure are described in detail above. Specific examples are used in this disclosure to illustrate the principle and the implementations of the present disclosure. The description of the above examples is only used to help understand the methods and its core idea of the present disclosure. Moreover, those skilled in the art can change both the specific implementations and the application scope according to the idea of the present disclosure. In summary, the content of this specification should not be construed as a limitation to the present disclosure.

The invention claimed is:

1. A random access control method, comprising:
   receiving, by a user equipment (UE), a bandwidth part switch command for a cell associated with a random access process during the random access process,
   determining, by the UE, whether the random access process is successfully completed;
   determining, by the UE, that the random access process is unsuccessfully completed, stopping, by the UE, the random access process; and
   switching, by the UE, a bandwidth part according to the bandwidth part switch command without continuing the random access process in the switched bandwidth part;
   wherein before stopping, by the UE, the random access process, the method further comprises:
   determining, by the UE, whether a switched uplink bandwidth part and a switched downlink bandwidth part have a same identifier; and
   determining, by the UE, that the switched uplink bandwidth part and the switched downlink bandwidth part have different identifiers.

2. The method according to claim 1, wherein before stopping, by the UE, the random access process, the method further comprises:
   determining, by the UE, whether the bandwidth part switch command is to switch a first downlink bandwidth part associated with the random access process to a second downlink bandwidth part; and
   determining, by the UE, that the bandwidth part switch command is to switch the first downlink bandwidth part associated with the random access process to the second downlink bandwidth part.

3. The method according to claim 1, wherein before stopping, by the UE, the random access process, the method further comprises:
   determining, by the UE, whether the cell associated with the random access process is a primary cell or a primary secondary cell; and
   determining, by the UE, that the cell associated with the random access process is the primary cell or the primary secondary cell.

4. The method according to claim 1, wherein before stopping, by the UE, the random access process, the method further comprises:
   determining, by the UE, whether the bandwidth part switch command is to switch an uplink bandwidth part and whether the switched bandwidth part is configured with random access resources; and
   determining, by the UE, that the bandwidth part switch command is to switch the uplink bandwidth part and the switched bandwidth part is not configured with the random access resources.

5. The method according to claim 1, further comprising:
  determining, by the UE, that the switched uplink bandwidth part and the switched downlink bandwidth part have the same identifier and the random access process is triggered by a beam failure recovery,
  determining, by the UE, whether the bandwidth part before switching and the switched bandwidth part have a same wireless link detection configuration parameter; and
  determining, by the UE, that the bandwidth part before switching and the switched bandwidth part have different wireless link detection configuration parameter.

6. The method according to claim 1, further comprising:
  determining, by the UE, that the switched uplink bandwidth part and the switched downlink bandwidth part have the same identifier and the random access process is triggered by the beam failure recovery, determining whether the switched downlink bandwidth part is associated with an available beam measurement result; and
  determining, by the UE, that the switched downlink bandwidth part is not associated with the available beam measurement result.

7. An electronic device, comprising:
  a processor; and
  a memory storing processor-executable instructions;
  wherein the processor is configured to perform acts comprising:
  receiving a bandwidth part switch command for a cell associated with a random access process during the random access process,
  determining whether the random access process is successfully completed;
  determining that the random access process is unsuccessfully completed, stopping the random access process; and
  switching a bandwidth part according to the bandwidth part switch command without continuing the random access process in the switched bandwidth part;
  wherein before stopping the random access process, the method further comprises:
  determining, by a user equipment (UE), whether a switched uplink bandwidth part and a switched downlink bandwidth part have a same identifier; and
  determining, by the UE, that the switched uplink bandwidth part and the switched downlink bandwidth part have different identifiers.

8. A non-transitory computer readable storage medium storing a plurality of programs for execution by an electronic device having one or more processors, wherein the plurality of programs, when executed by the one or more processors, cause the electronic device to perform acts comprising:
  receiving a bandwidth part switch command for a cell associated with a random access process during the random access process,
  determining whether the random access process is successfully completed;
  determining that the random access process is unsuccessfully completed, stopping the random access process; and
  switching a bandwidth part according to the bandwidth part switch command without continuing the random access process in the switched bandwidth part;
  wherein before stopping the random access process, the method further comprises:
  determining, by a user equipment (UE), whether a switched uplink bandwidth part and a switched downlink bandwidth part have a same identifier; and
  determining, by the UE, that the switched uplink bandwidth part and the switched downlink bandwidth part have different identifiers.

* * * * *